No. 744,690. Patented November 17, 1903.

UNITED STATES PATENT OFFICE.

ROMEDIUS PANZL, OF MUSKEGON, MICHIGAN.

COMPOSITION FOR ACID-PROOF LINING OF DIGESTERS.

SPECIFICATION forming part of Letters Patent No. 744,690, dated November 17, 1903.

Original application filed August 6, 1902, Serial No. 118,667. Divided and this application filed May 4, 1903. Serial No. 155,660. (No specimens.)

*To all whom it may concern:*

Be it known that I, ROMEDIUS PANZL, of Muskegon, county of Muskegon, and State of Michigan, have invented certain new and useful improvements in composition for acid-proof lining of digesters and of other vessels and conduits used for storing, boiling, or conveying of corrosive liquids, of which the following is a specification.

The following is a full, clear, and exact specification of my invention, which consists of the hereinafter-described composition of matter to be used as lining for the interior of such vessels and conduits.

Wood-pulp digesters are boilers constructed of iron. In the preparation of wood-pulp for paper-making corrosive liquids are used that would rapidly destroy the iron shell of the digester if brought in contact therewith. It is therefore necessary to line the interior of such digesters with some impervious material which is not disintegrated or affected by the corrosive liquids used in the digesting process. A lining constructed of the material and in the manner as set forth in the Letters Patent No. 644,367, granted to me February 27, 1900, is absolutely proof against and impermeable by any corrosive liquid. It is practically indestructible, but is non-elastic and almost non-expansible.

The sulfite process most employed in preparing and digesting pulp for paper-making requires also a very high degree of heat and pressure. During this digesting process the digester is hermetically closed, and therefore is subjected to an interior pressure, in some instances as high as one hundred and sixty (160) pounds to a square inch. The heat and pressure acting on the digester causes the iron shell thereof to expand, and this sometimes results in cracking the lining or tearing it off in some places from the shell. The pressure within the digester being so very great, the corrosive liquid is forced through the most minute crevices produced by the cracking of the lining and damages the shell wherever it comes in contact therewith. Having experimented to obviate also this difficulty in the lining of digesters, I have succeeded in compounding the hereinafter-described composition of matter for such linings, which is equally impervious to and proof against any corrosive liquid as the composition of matter set forth in my aforesaid Letters Patent No. 644,367, and in addition thereto possesses also the quality of expanding in a slightly-higher degree than iron when exposed to heat. The composition is also a bad conductor of heat. When subjected to heat under the conditions as prevail in a pulp-digester, it is rendered to some extent yielding and expands, and while its imperviousness and resistive quality to such corrosive liquids remains in this state unimpaired it adjusts itself to the expanded shell of the digester and does not bulge, crack, or separate from the shell when the latter contracts again.

This composition is made up of calcined chamotte, slag, burnt cement, and coal-tar, an equal part, measured by volume, being used of each, pulverized and mixed dry, and then made into a plastic mass by adding thereto a sufficient quantity of liquid silicate of soda of not less than 30° nor more than 45° Baumé. The dry ingredients can be prepared in larger quantities; but only such quantity of the mixed material should be made into a plastic mass at one time as required for immediate use.

For practical use the composition for the lining is prepared as follows: The dry ingredients, an equal part of each, are mixed in a suitable vessel. This mixing must be done very thoroughly, and it is therefore preferable to mix only a smaller quantity at any one time—about one gallon of each ingredient. Of this composition a small quantity is transferred to a trough and there mixed with a sufficient quantity of liquid silicate of soda of the stated quality into a plastic mass. This is then immediately used in making the lining. The best results are obtained if two or three workmen coöperate, one constantly preparing the plastic mass in small quantities and the others applying the same. The mortar hardens rapidly, and care must be taken that each successive addition of lining is applied before the preceding part is hardened. The inside of the digester to which the lining is to be applied must be free from rust and absolutely clean, and the digester must be kept moderately heated while the lining is being applied.

The lining need not be made more than one inch thick.

In the course of my experiments I subjected the lining, constructed of the stated ingredients and as hereinbefore described, to most severe tests and found that one-inch thickness thereof is sufficient under any conditions to protect the shell of the digester from the effects of corrosive chemicals as are used in digesters and that it will stand a heat and pressure largely exceeding that required to be maintained in digesting pulp by the so-called "sulfite" process.

The manner of applying the composition of matter set forth therein and using it in combination with other constituent parts of a digester-lining is more fully set forth and claimed in my application for Letters Patent filed August 6, 1902, Serial No. 118,667, of which this application is a subdivision.

I claim as my invention—

1. A composition of material for lining of vessels and conduits used for storing, boiling or conveying of corrosive liquids, made up of calcined chamotte, slag, burnt cement, coal-tar, and liquid silicate of soda.

2. A composition of material for lining of vessels and conduits used for storing, boiling or conveying of corrosive liquids, made up of approximately equal parts, measured by volume, of calcined chamotte, slag, burnt cement, and coal-tar, and of liquid silicate of soda.

ROMEDIUS PANZL.

Witnesses:
W. S. HORN,
PAUL E. MEESKE.